Sept. 7, 1954

J. M. CLARK 2,688,455

RETRACTABLE SURFACE SUPPORT

Filed Aug. 14, 1951

INVENTOR

James M. Clark

Sept. 7, 1954  J. M. CLARK  2,688,455
RETRACTABLE SURFACE SUPPORT
Filed Aug. 14, 1951  2 Sheets-Sheet 2

INVENTOR
James M. Clark

Patented Sept. 7, 1954

2,688,455

UNITED STATES PATENT OFFICE 2,688,455

RETRACTABLE SURFACE SUPPORT

James M. Clark, Jamaica, N. Y., assignor to North American Aviation, Inc., a corporation of Delaware Application August 14, 1951, Serial No. 241,743

14 Claims. (Cl. 244—42)

This invention relates generally to aircraft sustaining surfaces and more particularly to improvements in mounting and supporting arrangements for flaps and other movable components associated with aircraft wings and similar structures.

In aircraft construction, in the mounting and supporting of such movable surfaces as flaps, ailerons and the like upon the wings, it has been found desirable to project the movable component an appreciable distance below and aft of the rear spar or other structural member in the region of the trailing edge of the wing. The drag or resistance which results from carrying a fixed mounting in the airstream at such distances from the main airfoil or wing frequently mitigates against the use of such arrangements. The co-pending application Serial No. 115,719 of Edward A. O'Brien filed September 14, 1949, entitled Retractable Flap Support, which issued as Patent No. 2,591,000 on April 1, 1952, is directed to an improved foldable or retractable pivot mounting or support for such movable surfaces which is fully retractable when not in use to thereby eliminate any drag during high speed or cruising flight, and which accordingly eliminates all of the objectionable results inherent in such fixed supports for movable surfaces which have been proposed and used heretofore.

The present invention relates to an improvement upon the construction disclosed in the above co-pending application and comprises essentially a foldable and separable mounting which may be in the form of a track or guide portion which is rigidly supported by a pivotal bracket from the relatively fixed wing and within which track the movable flap or other component is arranged to be guidingly supported. A hinged bracket portion rotatably mounted upon the fixed wing structure is journalled upon a fixed shaft or pivot about which the hinged bracket may be rotated into its extended operative position at which it carries the guide or track at an appreciable distance below the wing surface and along which track the flap may be guidingly moved rearwardly and downwardly. The separable pivots disposed upon a chordwise axis about which the hinged bracket assembly rotates are provided with self-alignment portions and a slotted retaining means which holds or locks the pivots and bracket portions together when the assembly is in the retracted position. Inasmuch as the flap or other component is extended only during landing and take-off conditions, or at times when the relative air speeds are low, the drag effects of the extended hinge brackets are negligible and not objectionable.

It is, accordingly, a major object of the present invention to provide an improved track mounting for a wing flap or other aircraft component. A further objective resides in the provision of a hinged bracket arrangement for a movable surface in which a portion of the bracket assembly is journalled for rotation upon a fixed wing and the remaining portion is journalled for rotation upon an alignable axis carried by the movable component. It is a corollary objective of the present invention to provide a projectible and retractable guide track mounting for a movable component in which the guide track is fully retractable within the profile of the wing when the track mounting is not in use. It is a further object to provide an improved hinged bracket assembly in which the track supported thereby is extendible to a position appreciably beneath the wing surface, as well as to provide separable and alignable bracket hinge portions which permit unfolding of the hinge assembly during extension of the flap rearwardly along its supporting guide track.

It is a still further object to provide such a guide track for a swingable bracket in which the separable pivot portions can be re-aligned and automatically locked in axial relationship upon the retractive movements of the flap supporting bracket along the guide track. Further objects of the present invention reside in the improved arrangement of the retractable flap support, the self-centering of the locking means, and the details of the respective elements, as well as their cooperative relationship. Other objects and advantages of the present invention will become apparent to those skilled in the art after reading the following description taken in conjunction with the accompanying drawings, forming a part hereof in which:

Figure 1:
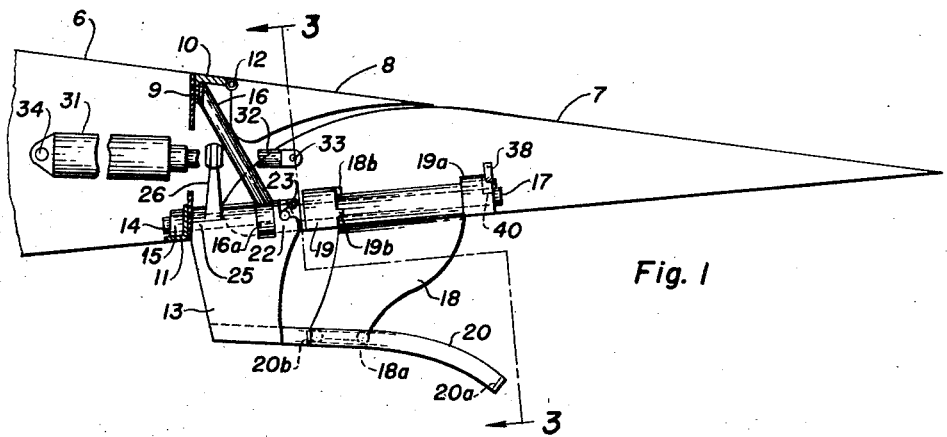
Fig. 1 is a sectional elevational view of a trailing portion of a wing in which the flap is shown in its retracted position and the improved form of the present retractable guide track support is shown in its extended position.

The relatively fixed wing 6 has operatively associated with its trailing edge a controllable flap 7 and an auxiliary hinged slot-fairing element 8. The wing may preferably be provided with a spanwise extending trailing edge spar or similar structural member 9 having a top chord angle 10 and a bottom chord angle 11. The hinged fairing element 8 is pivotally mounted upon the top chord element 10 by means of the hinge 12 such that the fairing 8 can be rotated partially in the counterclockwise direction as the flap is guided downwardly and rearwardly in the clockwise direction for improvement of the airflow through the slot created between the trailing edge of the wing 6 and the leading edge of the flap 7. It will be understood, however, that the hinged fairing element 8 is merely incidental to the type of flap which has been selected for the present description and that the present invention is applicable to other types of flaps, ailerons, control surfaces or other movable components, other than those which have been illustrated and which may or may not have associated therewith elements of the type of the fairing 8.

A pivotally mounted wing bracket or support 13 has rigidly attached to its lower or free terminal the guide track 20, the bracket 13 being rotatably mounted at its upper portion 25 for rotation about a preferably fixed pivot hinge or shaft 14. The pivot shaft 14 is fixedly supported at its forward portion by means of the bearing fitting 15 fixedly attached to the chord element 11 of the spar 9, and the shaft 14 is also supported adjacent its rear terminal by the depending bracket fitting 16 which is secured to the top chord 10 of the spar 9. The pivot shaft 14 and its journal fittings 15 and 16a are disposed upon a generally fore and aft, or chordwise extending, axis about which the track supporting bracket 13 is arranged to be rotated through approximately 90° from its extended position shown in full lines in Figs. 1, 3 and 4, to its retracted position as shown in construction lines in Fig. 3, in which it lies within the airfoil contour formed by the fixed wing 6 and the movable flap 7. The pivot shaft 14 has a rearwardly aligned counterpart in the pivot shaft 17 which forms the pivot for a generally similar flap supporting bracket 18, the shaft 17 being journalled within the lower portion of the flap 7 for limited rotational movements within the lower portion of the flap 7 within the fittings 19 and 19a, the shaft being urged into its normal position by the resilient centering means shown in Fig. 7 and to be more fully described below.

Figure 3:
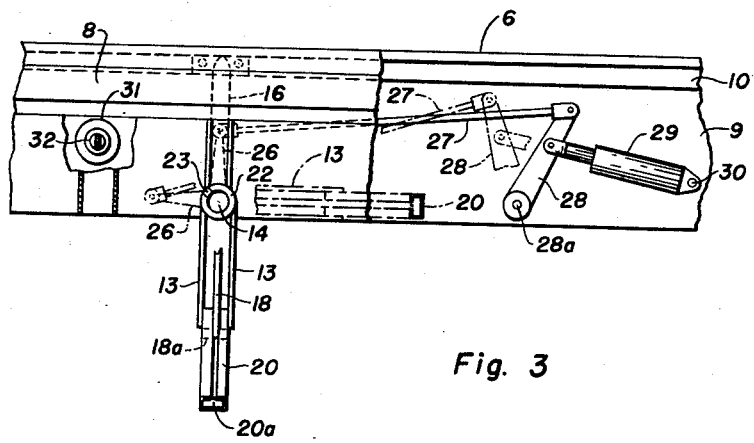
Fig. 3 is a rear elevational view of the arrangement shown in Fig. 1 with portions of the flap broken away for purposes of clarity.

The respective track supporting bracket 13 and the flap supporting bracket 18 are disposed such that they lie in fore and aft chordwise alignment and rotate together about the aligned pivot shafts 14 and 17 in the locked condition of the said shaft portions and in the retracted position of the flap 7. As stated above, the guide track 20 is fixedly attached to the free terminal of the element 13 and in effect forms therewith an angularly shaped bracket member of relatively great rigidity with the guide track portion 20 within which the flap supporting element 18 is guidingly supported for fore and aft movements in such manner that the member 18 is restrained from lateral movement with respect to the track portion 20, from which it is supported, and with respect to the bracket member 13 supporting the track portion. The lower or free portion of the bracket 18 is provided with a plurality of rollers 18a which are adapted to run along the guide track 20, being restricted in their rearward and downward movement by the rear track stop 20a, and in their forward movement by the forward track stop 20b. The aftmost portion of the track 20 may be arcuately or otherwise curved to impart a rotating component to the projected movement of the flap 7, being suitably curved to meet the aerodynamic requirements of the flap in its several operative positions with respect to the fixed wing 6. On the other hand, in certain installations of other components, either supported from the trailing or leading edge of the wing, it may be desirable to utilize a straight track, or a track curved in the opposite direction, or to have a straight trailing portion with a curved leading portion. The bracket elements 13 and 18 as well as the guide track member 20 always lie within the same plane either substantially parallel to the undersurface of the wing and flap combination in the retracted position of the guide track or in a substantially vertical chordwise extending plane as shown in Figs. 1 and 3 in the extended operative position of the supporting guide track.

Figure 5:
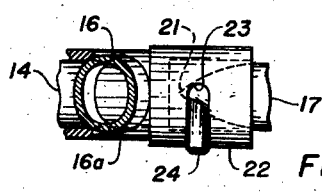
Fig. 5 is a detailed plan view of the separable pivot terminals and locking means for the separable portions.
Figure 6:
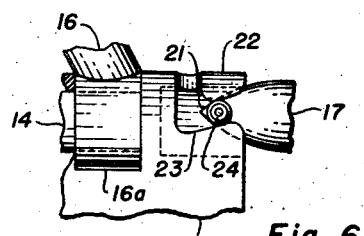
Fig. 6 is an elevational view of the same.

The pivot shaft 17, as shown in Figs. 5 and 6, is provided with a pointed forward terminal 21 having a locking roller 24 pivotally mounted thereon for engagement with the socket terminal and the slot 23, respectively, of the locking fitting 22 associated with the bracket 13. The latter bracket is also provided with a hub portion 25 rotatably mounted upon the pivot shaft 14 and having an upstanding arm or bracket 26 by means of which the bracket 13 and the guide track 20 are rotated about the shaft 14 between their extended and retracted positions, i. e., in the spanwise direction about the chordwise axis. As shown in Fig. 3, the outer terminal of the arm 26 is pivotally connected to the push-pull rod 27 which in turn is pivotally connected to the crank or lever 28, operatively connected to the latch actuating motor 29, which is pivotally mounted upon the wing structure at the pivot 30. The flap 7 is extended and retracted by a suitable actuating motor 31 having a piston rod or other extensible element 32 pivotally connected to the flap at pivot 33, the motor 31 being pivotally mounted upon the wing structure at the pivot 34.

Figure 4:
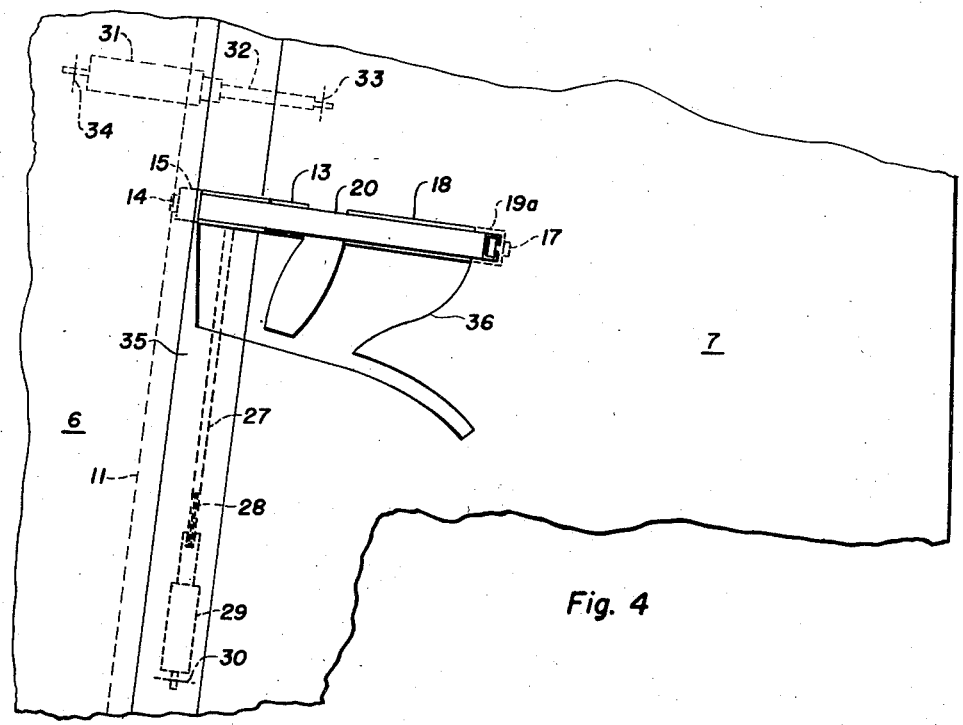
Fig. 4 is a bottom plan view of the wing, flap and track support in the relationship of the components shown in Figs. 1 and 3.

As shown in Fig. 4, looking upward beneath the wing, the gap, between the wing 6 and the leading edge of the flap 7, is closed and faired flush with the lower surface by the fairing piece 35. Both this fairing 35 and the flap 7 are provided with a recess 36 within which the brackets 13 and 18 and the track 20 is received and faired in the retracted position flush with the lower surface of the flap and the fairing piece. Suitable stops 18b and 19b are provided to limit the rotation of the bracket 18 about its pivot shaft 17, and alternatively might comprise automatic locks initiated by thrust or pull exerted through the rod 32.

Figure 7:
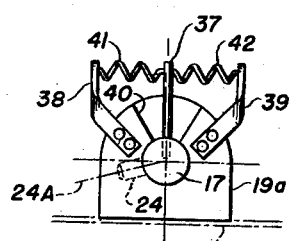
Fig. 7 is an end elevational view of the bracket mounting within the flap showing the self-centering means for the aftmost pivot portion.

In order to insure proper positioning of the locking roller 24 pivotally mounted upon the nose 21 of the rear pivot shaft 17 the aft portion of the latter is provided with the resilient self-centering means shown in Fig. 7. An upstanding pin or rod 37 is fixed to the rearward extension of the pivot shaft 17 and at either side of the pin 37 there is attached to the end of the bearing fitting 19a the upstanding brackets 38 and 39. The upper portion of the end of the bearing fitting 19a is also notched or recessed as at 40 such that the ends of the notched portion are disposed in the path of the pin 37 and limit the partial rotation of the shaft within the bearing fittings 19 and 19a, the pivot shaft 17 being restrained from axial or chordwise movement with respect to its bearing fittings 19 and 19a. Tension springs 41 and 42 are interconnected between the bracket 38 and the pin 37 on the one side, and the bracket 39 and the pin 37 on the opposite side to resiliently urge the pin and the attached shaft 17 into its normal central or neutral position in which the roller 24 is disposed on its resiliently centered axis 24A. This resilient centering means insures that the shaft 17 and the roller 24 become properly aligned for entrance into the slot 23 when the flap is retracted and also that the roller assumes the proper position within the slot 23 at which it locks the pivot shafts 14 and 17 together when the guide track assembly has been retracted.

The operation of the improved retractable guide track arrangement is as follows: With the flap and the guide track mechanism both in their retracted position, the guide track is initially extended by compacting movement of the actuator 29 which, as viewed in Fig. 3, imparts clockwise rotation to the lever 28 about its pivot 28a. Similar clockwise rotation is imparted to the lever 26 about the axis of the pivot shaft 14 through the intermediacy of the push-pull rod 27; the bracket support 13 and the attached guide track 20 are concurrently caused to be extended downwardly into the airstream beneath the undersurface of the wing; and the flap carrying support bracket 18 carried downwardly with them at the same time, until all of these elements assume the position shown in Figs. 1 and 3. Such clockwise rotation of the supporting bracket 13 and its slotted hub portion 22 causes the latter to assume a position as shown in Fig. 1 in which the roller 24 is free to be moved rearwardly with the rear pivot shaft 17 in its unlocked or released relationship with respect to the forward pivot shaft 14. The flap 7 has now become supported vertically upon the flap supporting bracket 18, of which it is understood that a plurality will be provided spaced in the spanwise direction for the support of the flap structure, and suitable spanwise bracing means may be provided to insure against undesired spanwise movement of the flap. The unlocked flap is now free to be moved rearwardly and downwardly to any desired position along the guide track 20 by extending movement of the flap actuator 31 and its extensible arm 32 pivotally connected to the flap adjacent the leading edge at the pivot 33. In the course of the initial rearward movement of the flap 7 the resilient centering springs 41 and 42 permit sufficient rotational movement of the roller 24 about the axis of the pivot shaft 17 to follow the angular mouth of the guide slot 23 in the locking fitting 22 and upon emergence from the mouth of the slot the roller again assumes its normally centered position on the axis 24A. In the embodiment which has been illustrated in the drawings the trailing portion of the guide track 20 is arcuately curved downwardly thereby imparting a partial rotational movement to the flap 7 as it approaches its terminal position in which the aftmost guide roller 18a engages the rear stop 20a.

Figure 2:
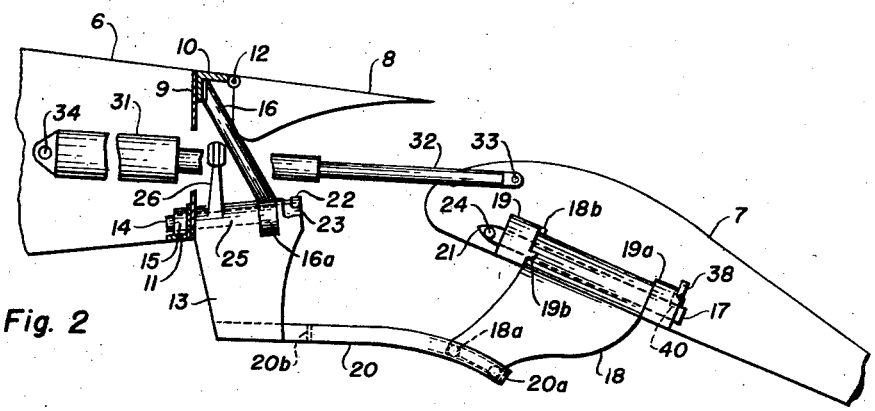
Fig. 2 is a similar elevational view of the same showing the flap in its rearwardly and downwardly extended position supported by the extended track support.

In the retraction or return movement of the flap 7, the opposite of the above described steps takes place. From the extreme position shown in Fig. 2, the flap actuator 31 is compacted and the flap 7 moves forwardly along a path determined by the curvature and shape of the guide track 20 until it approaches its retracted position at which the roller 24, aided by the nose portion 21 of the rear pivot shaft 17, is guided into the mouth of the locking slot 23 and the flap 7 is stopped in its forward movement at which time the forward roller 18a engages the track stop 20b. The track operating actuator 29 is then extended, imparting counterclockwise rotational movement to the levers 28 and 26 as well as the track assembly 13—18—20 about the aligned pivot of the shafts 14 and 17 and the track supporting mechanism is rotated into the dotted position as shown in Fig. 3. As the locking portion 22 of the support bracket 13 is rotated in the counterclockwise direction as viewed in Fig. 3, the slot 23 is caused to move past the roller 24 into a position in which the latter prevents separation of the pivot shaft 17 from the locking portion 22 and in conjunction with suitable locking or irreversible features associated with the flap actuating mechanism 31 the flap is securely locked in its retracted position in which it forms a substantially streamlined continuation of the fixed wing 6. Similar irreversible or locking mechanism associated with the track actuating member 29 locks the guide track 20 and the associated supporting brackets 13 and 18 securely in their retracted positions.

Suitable sequence mechanism may preferably be provided to prevent actuation of the flap extension motor 31 while the hinge bracket and track assembly 13—18—20 is in its retracted position, and also to insure retracting movement of the flap prior to the retraction of the guide track assembly. It will be noted that a rigid flap support and guide is provided at an appreciable distance aft of the rear spar of the fixed wing and considerably below the lower surface of the wing and its associated flap, the guide track being fully retractable to a position within the combined airfoil contour of the wing and the flap. With the guide track and support brackets extended only in the low speed conditions in which the flap is utilized, the drag or resistance caused by the extended bracket and track assembly is not objectionable. It will be understood that while but one retractable guide track has been shown and described, at least two or more would normally be provided for an actual flap installation, and also that it may similarly be desirable to provide either a single power source for the extension and retraction of the guide track or suitable means for insuring their substantially synchronous operation In the case of long span flaps, it may also be desirable to provide a plurality of flap actuating motors, which of course can also be other than the fluid-actuated type shown and described herein by way of example only.

Other forms and modifications of the present invention both with respect to its general arrangement and the details of its several parts, which may occur to those skilled in the art after reading the foregoing description, are all intended to come within the scope and spirit of the present invention as more particularly set forth in the appended claims.

I claim:

1. In an aircraft wing flap installation, a relatively fixed wing, a movable flap, first pivot means supported by said wing disposed on a chordwise axis, second pivot means supported by said flap disposed aft of and in chordwise alignment with said first pivot means, means including a guide track portion pivotally mounted upon said first pivot means and a flap supporting member pivotally mounted upon said second pivot means and slidingly engageable with said guide track portion.

2. The combination with a relatively fixed wing and a flap operatively carried by the trailing portion of said wing, of a guide track for said flap pivotally mounted upon a chordwise axis upon said wing, means for extending said guide track between retracted and extended positions about said chordwise axis and with respect to said wing, and supporting means pivotally carried by said flap for engagement with said guide track for the support of said flap from said guide track in its extended position.

3. In aircraft, a wing, a movable surface carried by said wing, first support means pivotally mounted upon said wing, surface support means pivotally mounted upon said surface, both said support means mounted upon chordwise aligned pivot axes, said first support means having a guide track member supported thereby, said second support means guidingly movable along said guide track member, means for rotating said first support means and said surface support means between retracted and extended positions about said aligned chordwise axis, and means for moving said surface and said surface support means along said guide track member into an extended operative position of said movable surface.

4. In aircraft including a wing and a flap, retractable track means for the sliding support of said flap from said wing including a pair of separable support members having chordwise aligned portions separately pivoted upon a common chordwise axis in the retracted position of said flap, the first of said support members pivotally mounted upon said wing and the second said support member pivotally mounted upon said flap, a flap guide track fixedly carried by the first of said separable members pivotally mounted upon said wing, said second separable member arranged for sliding engagement with said guide track for the movable support of said flap with respect to said track, means for rotating said separable members simultaneously about the chordwise axis of said aligned portions for the extension of said flap guide track and means for moving said flap into an extended position along said guide track by the separation of said separable support members.

5. In an aircraft, a wing, a movable surface, and a retractable guide track mounting for said movable surface comprising a first support element rotatively mounted upon a chordwise axis upon said wing, a second support element rotatably mounted upon a chordwise axis upon said movable surface, a guide track fixedly supported from said first support element and slidingly engageable by said second support element, means to rotate both said support elements and said guide track about said chordwise axis concurrently between retracted and extended positions, and means for extending and retracting said movable surface and said second support means along said guide track.

6. In aircraft including a wing and a flap, retractable guide track means for the guiding support of said flap from said wing including a pair of separable support members having chordwise aligned portions, a first said support member pivoted upon said wing, a second said support member pivoted upon said flap, a guide track carried by a first of said separable support members, said aligned separable support member portions having a common chordwise axis in the retracted position only of said flap, means for rotating both said separable support members and said guide track about the chordwise pivot axis of said aligned portions for the extension of said flap guide track, means for actuating said flap along said guide track, and means initiated by retracting movement of said guide track by said separable support members for locking said separable portions together.

7. In an aircraft, a wing, a flap, first pivot means having a chordwise axis carried by the trailing portion of said wing, first support means pivotally mounted for rotation about the chordwise axis of said first pivot means, second pivot means carried by said flap on a chordwise axis alignable with said first pivot means, second support means pivotally mounted for rotation about the chordwise axis of said second pivot means, a guide track fixedly attached to said first support means and guidingly supporting said second support means at portions of said support means remote from said pivotal mountings upon said wing and upon said flap, means to extend and retract said flap along said guide track means, and means to rotate both said support means about the axes of said first and second pivot means for the retraction of said guide track.

8. In an aircraft, a wing, a movable surface operatively carried by the trailing edge of said wing, track supporting means rotatably mounted upon a chordwise axis upon the trailing portion of said wing, movable surface supporting means pivotally mounted upon said movable surface, a movable surface guide track fixedly supported from said track supporting means, said movable surface supporting means slidingly engaging said guide track, means for rotating said guide track and said movable surface supporting means between a retracted and an extended position at which said guide track is disposed beneath the under surface of said wing and said movable surface, and actuating means for extending and retracting said movable surface in a chordwise direction along said guide track.

9. In an aircraft, a wing, a flap, and a retractable guide track mounting for said flap comprising a first support element rotatively mounted upon a chordwise axis upon said wing, a second support element rotatably mounted upon a chordwise axis upon said flap, a guide track fixedly supported from said first support element and slidingly engageable by said second support elements, means to rotate both said support elements and said guide track about said chordwise axis concurrently between retracted and extended positions, means for extending and retracting said flap and said second support means along said guide track, and automatic means initiated by the extension and retraction of said guide track for unlocking and locking said flap with respect to said wing.

10. In aircraft including a wing and a flap, retractable guide track means for the guiding support of said flap from said wing including a pair of separable support members having chordwise aligned portions a first said support member pivoted upon said wing, a second said support member pivoted upon said flap, a guide track carried by a first of said separable members, said aligned separable member portions having a common chordwise axis in the retracted position only of said flap, means for rotating both said separable support members and said guide track about the chordwise pivot axis of said aligned portions for the extension of said flap guide track, means for actuating said flap along said guide track, means including a detent carried by said flap and a recess in one of said support members for locking said separable portions together initiated by retractive movement of said guide track by said separable support members.

11. The combination with a relatively fixed wing and a movable surface operatively carried by the trailing portion of said wing, of a retractable surface support assembly pivotally mounted upon said wing upon a substantially horizontal axis for lateral and downward movement between retracted and extended positions with respect to said wing and with respect to said movable surface, said surface support assembly including a guide track means arranged to support said movable surface in the extended position of said surface support assembly for the support of said surface for rearward and downward translatory movements of said surface along said guide track means and with respect to the trailing portion of said wing.

12. In aircraft, a relatively fixed wing, a movable component operatively associated with said wing, said movable component forming in its retracted position a portion of the airfoil profile of said wing, a component support assembly pivotally mounted upon said wing upon a substantially horizontal axis for lateral movement spanwise of said wing between a retracted position within said wing profile to an extended position beneath said wing and said component, said component support assembly including a guide means and a component support element pivotally mounted upon said surface and slidingly engageable with said guide means arranged for the movement of said component along said guide means in a profile-changing slot-forming relationship with respect to said wing.

13. An aircraft wing arrangement of the type called for by claim 12 characterized by the inclusion of means operatively connected to said component support assembly for movement of said guide means into its extended operative position beneath said wing and said component.

14. An aircraft wing arrangement of the type called for by claim 12 characterized by the inclusion of means operatively connected to said component support assembly for movement of said guide means into its extended operative position beneath said wing and said component, and locking means including complementary engaging portions carried by said wing and said movable component initiated by actuation of said operatively connected means for the automatic unlocking and locking of said movable component to said wing as said component support assembly is extended and retracted, respectively.

References Cited in the file of this patent

UNITED STATES PATENTS

| Number | Name | Date |
|---|---|---|
| 2,591,000 | O'Brien | Apr. 1, 1952 |

FOREIGN PATENTS

| Number | Country | Date |
|---|---|---|
| 951,122 | France | Apr. 11, 1949 |